June 13, 1961 R. SASSENBERG 2,988,043
APPARATUS FOR THE PROJECTION OF IMAGES
Filed Nov. 21, 1957 2 Sheets-Sheet 1
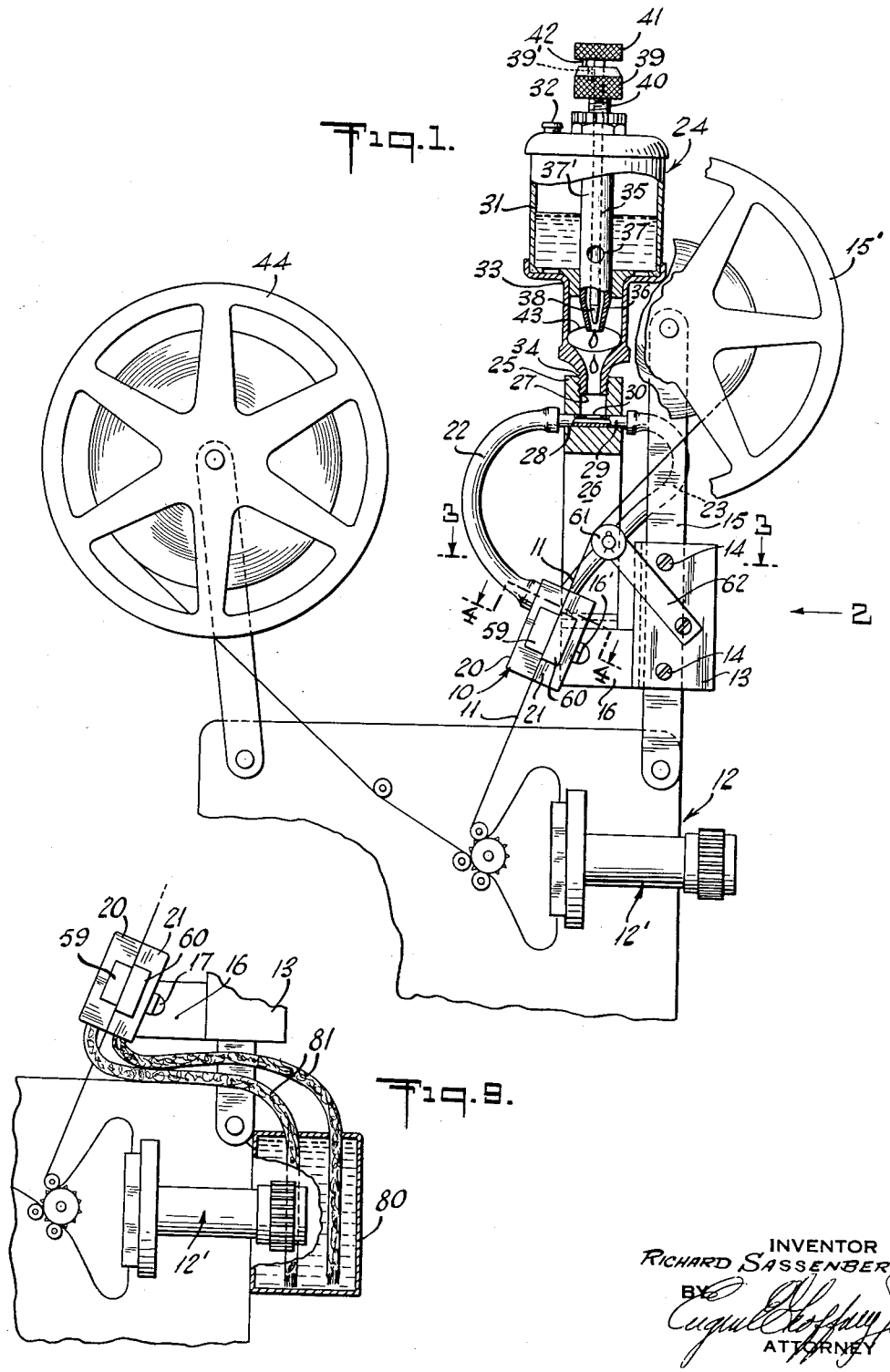
INVENTOR
RICHARD SASSENBERG
BY
ATTORNEY June 13, 1961  R. SASSENBERG  2,988,043
APPARATUS FOR THE PROJECTION OF IMAGES
Filed Nov. 21, 1957  2 Sheets-Sheet 2
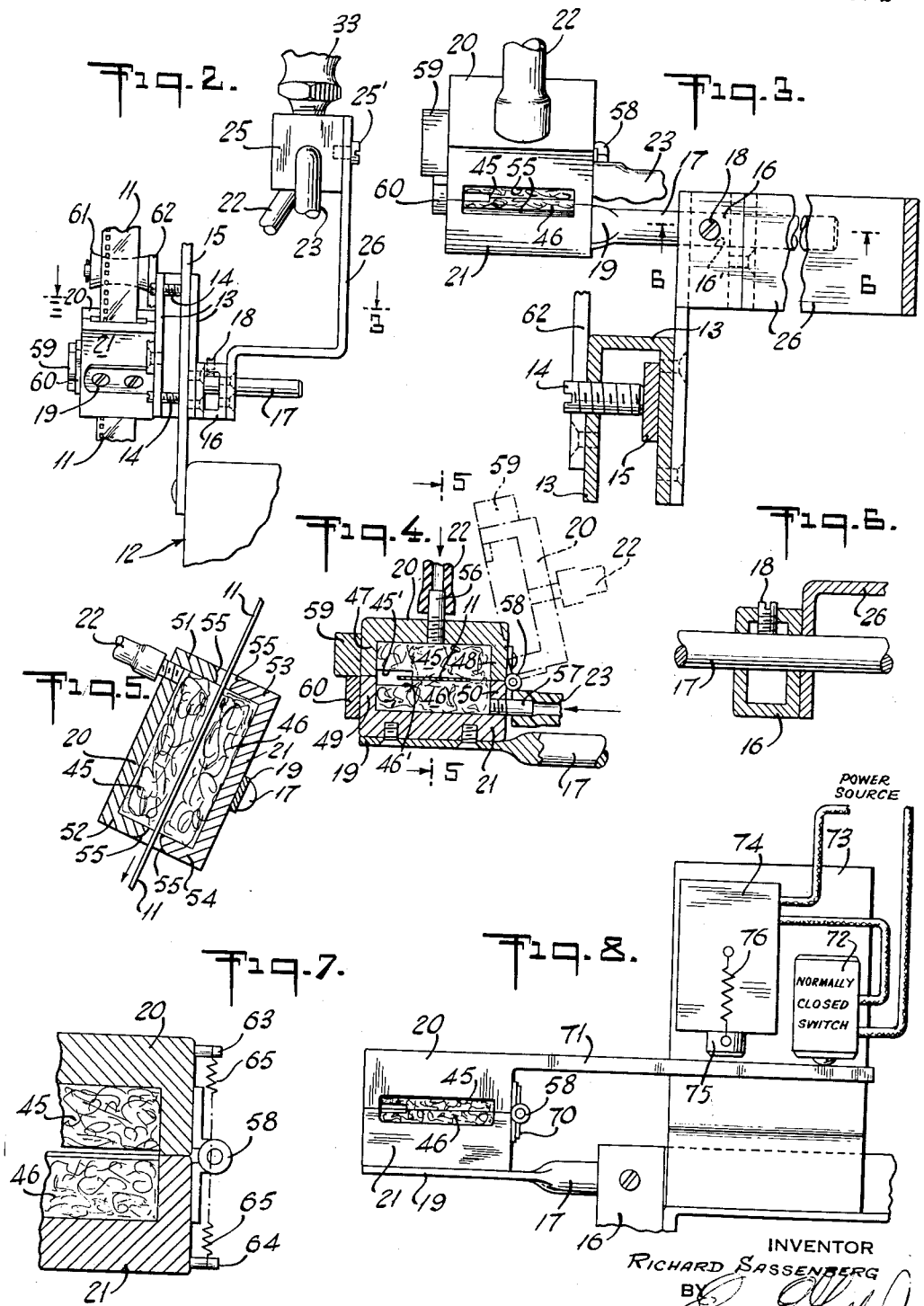
INVENTOR
RICHARD SASSENBERG
BY
ATTORNEY

United States Patent Office 2,988,043
Patented June 13, 1961

2,988,043
APPARATUS FOR THE PROJECTION OF IMAGES
Richard Sassenberg, 905 Palmer Ave., Mamaroneck, N.Y.
Filed Nov. 21, 1957, Ser. No. 697,834
13 Claims. (Cl. 118—12)

This invention relates to the projection of images carried by transparent or translucent film material and more specifically to an improved apparatus particularly useful among other things, for the projection of motion picture film to provide a clearer, more distinct image and at the same time increase the useful life of the film.

Motion picture film presently used for direct projection and for television transmission is a relatively soft material, quite susceptible to damage from dust and other foreign particles accumulating on the film and caught in the gate of the projector. Mars and scratches often appear on the film after relatively few runs and these scratches are sufficiently distracting to require frequent replacement in order to maintain good image quality. This not only increases the cost of the film but requires film handlers to maintain relatively large stocks.

This invention not only minimizes damage to the film through the presence of foreign matter that may have accumulated thereon, but removes scratches and other film deformations from the projected image and protects the film against damage caused by the heat of projection. In addition, improved image quality is obtained, particularly with high intensity sources since evaporation of the liquid removes large quantities of heat and materially reduces buckling during the projection period of each frame.

Many motion picture films are often intentionally cut to remove portions thereof or accidentally broken so that the average film for television broadcasting, for instance, includes numerous splices. In addition, the sprocket holes are often broken so that care must be exercised in the handling of the film to prevent further damage through tearing the film and breaking splices.

With the improved treating means in accordance with the invention spliced and damaged film can be coated and cleaned with little, if any, danger through an improved arrangement of elements which limits tension and other stresses on the film.

Another object of the invention resides in a novel and improved device for applying liquid coatings to the film that is characterized by its simplicity and ease of operation.

Still another object of the invention resides in a novel and improved coating device for applying a liquid coating to film immediately prior to projection that will automatically disengage itself from the film if the film, for any reason, does not freely pass therethrough.

A still further object of the invention resides in a novel and improved liquid applicator for film that applies minimum stress to the film and reduces wear and abrasion of the applicator elements.

A still further object of the invention is the provision of an improved liquid for coating film immediately prior to the projection thereof.

A still further object of the invention resides in a novel and improved liquid applicator for the projection of motion picture film that applies uniform liquid coatings to the film and that requires minimum maintenance and adjustment.

All the above and other objects and advantages of the invention will become more apparent from the following description and accompanying drawings forming part of this application.

In the drawings:

FIG. 1 is a side elevation of one embodiment of the invention illustrating its cooperation with a motion picture projector;

FIG. 2 is an elevational view of a portion of the apparatus shown in FIG. 1 and taken in the direction of the arrow 2;

FIGS. 3 and 4 are cross sectional views of FIG. 1 taken along the lines 3—3 and 4—4 thereof;

FIG. 5 is a cross sectional view of FIG. 4 taken along the line 5—5 thereof;

FIG. 6 is a cross sectional view of FIG. 3 taken along the line 6—6 thereof;

FIG. 7 is a fragmentary view of a modified liquid applicator in accordance with the invention;

FIG. 8 is an elevational view of still another modification of a liquid applicator in accordance with the invention; and FIG. 9 is still another embodiment of the invention.

The embodiment of the invention illustrated in the drawings and more specifically in FIGS. 1 to 3, inclusive, includes an improved film applicator generally denoted by the numeral 10 positioned relative to the film 11 so that the latter will pass through the applicator and thence into a projector, diagrammatically illustrated at 12. The applicator 10 may be supported in any desirable manner as, for instance, by attachment to a U-shaped clamp 13 having set screws 14 for securing the clamp to the reel arm 15. More specifically, the U-shaped clamp 13 carries a bracket member 16 extending therefrom and having an opening 16' for the reception of a rod 17. A set screw 18 threadedly engages the bracket 16 and bears against the rod 17 to hold it in its adjusted position. The outer end of the rod 17 has a flat end as indicated at 19, and carries the applicator 10. Thus, the applicator is adjustable angularly and transversely of the film 11 so that it may be readily aligned therewith. The applicator, which will be described more fully, includes two cooperating elements 20 and 21 to which liquid is fed by means of tubes 22 and 23 for coating both sides of the film 11. Liquid is fed to the tubes from a liquid supply generally denoted by the numeral 24 and carried by a block 25 pivotally secured to a bracket member 26. The bracket member 26 is fixedly secured to the bracket 16 as may be observed clearly in FIG. 2 and extends upwardly therefrom. The block 25 includes a threaded opening 27 for the reception of the liquid cup 24 and the lower end of this opening terminates in a transverse opening 28 in which is secured a tube 29. Tube 29 extends from the opposite faces of the block 25 for attachment of tubes 22 and 23. The center of conduit 29 has an opening 30 axially aligned with the opening 27.

The liquid supply 24 has an outer, liquid-tight housing or container 31 and a top filler cap 32. The container 31 is supported by a lower cylindrical extension 33 terminating in a threaded portion 34 for engagement with the threaded opening 27. Centrally of the container 31 there is a tubular member 35 having an inwardly tapered lower end portion 36. This tube has a side opening 37 for the admission of liquid into the tube 35. The flow of liquid from the tapered portion 36 is controlled by an elongated valve stem 37' having a tapered end portion 38 which in its lower positon closes the bottom end of the tube 35. The open position of the valve stem 37 is adjusted by a nut 39 threadably carried by a stem 40 and the stem is raised to the open position by lifting the stem knob 41. A pin 42 on the knob 41 engages the nut 39 to hold the valve open. To close the valve the knob 41 is rotated until the pin 42 engages an opening 39' in the nut 39. It is apparent from the above that the rate of flow is controlled by the vertical position of the nut 39 and the flow can be visibly observed through openings 43 in the tubular portion 33. The flow from the fluid cup 24 is in the form of drops and with the cup in a vertical position, the drops of fluid will fall into the opening 30 in the tube 29. This action causes the drops to divide substantially equally between the two tubes so that equal amounts of liquid are applied to each half of the liquid applicator 10. Leveling of the fluid cup 24 is accomplished by the attachment of the device to the reel arm 15 which holds the reel 15' in a vertical position. This levels the cup 24 in one plane. Leveling of the cup in the other plane is accomplished by loosening a screw 25' holding the block 25 to the bracket 26. When the block is properly levelled the screw is tightened and the cup or supply will remain in adjusted position.

One embodiment of the applicator in accordance with the invention is shown in FIGS. 4 and 5. The halves or elements of the applicator are substantially the same, except for the manner in which the tubes 22 and 23 are coupled thereto. Each element 20 and 21 of the applicator 10 are substantially rectangular and are hollowed out to receive absorbent pads 45 and 46. The side walls 47 and 48 of the applicator portions 20 and 49 and 50 of the applicator portions 21 are held in meeting engagement. The walls 51 and 52 of the sections 20 and 53 and 54 of the section 21 are slightly shorter than the side walls and have rounded portions 55 through which the film 11 passes. The pads 45 and 46 which are identical and controlled in thickness so that the meeting surfaces just enter into meeting engagement with the halves of the applicator in the position shown in FIG. 4. The liquid tube 22 which is of a flexible material is secured to a coupling member 56 threaded into the wall of the applicator member 20 and supplies liquid to the pad 45. The tube 23 is similarly connected by a tubular connector 57 to the side wall 50 of the applicator section 21 and supplies liquid to the pad 46.

In the case of 16 mm. sound film a single set of sprocket holes is generally utilized on one side of the film as illustrated in FIG. 2. It has been found that these sprocket holes when passing between the pads 45 and 46 tend to abrade the pads and carry small pieces into the projector. To avoid this difficulty and at the same time reduce the friction between the film and the applicator, the pads 45 and 46 are cut away as indictaed at 45' and 46' so that the pads are actually spaced from the sprocket holes themselves. In this way liquid is applied to both sides of the film immediately adjoining the sprocket holes while the sprocket holes are left free to pass up through the applicator. This structure also results in another advantage in that broken or damaged sprocket holes will not catch in the pads 45 and 46 and further damage the film, if not break the film entirely.

The applicator in accordance with the invention further includes means permitting the elements 20 and 21 to spring apart should a defective splice or other film defect tend to interrupt the free travel of the film therethrough. For this purpose the two elements 20 and 21 of the applicator are hinged together by a hinge 58 and are held in a closed position by a magnet 59 secured to the applicator section 20 and a piece of cooperating magnetic material 60 secured to the applicator portion 21. The magnet 59 is provided with sufficient magnetic force to hold the applicator halves together, as shown in FIG. 4. Should a splice catch on one of the felt pads, the two elements of the applicator will separate before the film is broken so that projection of the film will not be interrupted. In the instant embodiment of the invention the use of a tube 22 of rubber will exert sufficient force on the element 20 to bring it to a relatively wide open position should the magnet 59 be moved out of actual contact with the magnet member 60.

The film 11 is guided through the applicator by a roller 61 carried by a bracket 62 secured to the U-shaped clamp 13. This roller, together with the alignment of the applicator with reference to the guide rollers in the projector 12, keeps the film 11 accurately aligned with the pads 45 and 46.

While the felts are recessed on one side as in FIG. 4 for 16 mm. film, in the case of other types of film utilizing two sets of sprocket holes the felt would be cut back similarly on both sides so that both sets of sprocket holes move clear of the pads.

Should it be desirable to provide for positive opening action of the applicator elements 20 and 21, a toggle spring arrangement such as shown in FIG. 7 may be employed. For this purpose the applicator halves or elements are provided with pins 63 and 64 which are coupled by a spring 65. The center line of this spring is arranged to lie between the pivot of hinge 58 and the applicator and may contribute slightly to the closing force afforded by the magnet 59, or may provide the sole closing force. With this arrangement, should the applicator halves be forced open by the action of the film, pivoting of the halves about the pivot 58 will move the spring towards the right of the pivot as shown in FIG. 7 and the spring will operate to spread the two halves.

FIG. 8 illustrates another modification of the invention showing electromagnetic means for opening the applicator elements 20 and 21 should the film passing between the pads 45 and 46 tend to separate the applicator halves. In this case the halves or elements of the applicator are hinged at 58 as illustrated and described in connection with FIG. 4. In addition, a small spring 70 is provided to hold the applicator elements in closed position as illustrated. The applicator element 20 includes an elongated arm 71 which engages a micro switch 72 to hold the switch firmly in the open position. The switch 72 may be mounted in any suitable manner as by means of a bracket 73 carried by the bracket member 16 previously described. Above the extension 71 there is a plunger type magnet 74 having a longitudinally movable plunger 75 held in the uppermost position as in FIG. 8 by spring 76. The magnet 74 and switch 72 are connected in series to a suitable source of electric power. With this arrangement should the film passing through the felts 45 and 46 tend to spread the elements 20 and 21, the switch 72 will be actuated, closing the electric circuit and causing the plunger 75 to move the element 20 outwardly away from the element 21. If desired, an auxiliary switch may be connected in series with the power source to deenergize the magnet 74 and facilitate closing the elements 20 and 21 of the applicator on the film to be coated.

FIG. 9 illustrates still another modification of the invention embodying a wick-type feed for the liquid instead of the gravity feed as shown in the preceding embodiments. In this figure the elements corresponding to like elements in the preceding figures carry identical numerals. The wick feed in this embodiment includes a suitable liquid receptacle 80 secured in a convenient position to the side of the projector 12 in a manner that will not interfere with the projection of a light beam from the projection lens denoted generally by the numeral 12'. The applicator elements 20 and 21 are connected to the container 80 by means of wicks 81. One end of each wick extends into its associated applicator elements 20 and 21, with the absorbent portions of the wick in firm contact with the associated applicator pads 45 and 46, as the case may be. The wicks are each provided with a core of absorbent material that will not be affected by the liquid being transported thereby. The absorbent material cores are coated with a plastic or other suitable impervious material to prevent evaporation of the liquid between the container and the head. The wicks 81 extend into the fluid within container 80 and portions of the wick immersed in the fluid are of course uncoated to permit free absorption of the liquid. The wicks 81 are made large enough to conduct a sufficient quantity of the liquid to provide the desired liquid coating on the film 11 passing between the pads 45 and 46.

Various types of coating liquids may be employed for the achievement of the desired results in accordance with this invention, though it has been found that liquids such as the chlorinated hydrocarbons with most of the hydrogens replaced as in perchlorethylene, 1,1,2-trichloroethene and 1,1,1-trichloroethane will produce the desired results. Perchlorethylene is preferable, as its rate of evaporation can be controlled to insure a liquid coating on the film during actual projection and evaporation of the coating immediately thereafter. Evaporation is accelerated by the heat of projection and this evaporation tends to keep the film cool. It has been found in actual tests that the temperature of the film during projection can be maintained from between 25 to 50 percent below normal film temperatures. This is particularly important in the case of the larger films for wide-screen projection where additional light is required and the added temperatures accompanying the use of increased light frequently cause the film frames to buckle during the projection periods.

This invention further provides for the use of a dye in the fluid for absorption of the longer wave lengths of light. This is attained by the inclusion of a blue dye, for instance, which has been found to provide a more realistic color rendition of the projected image.

While only certain embodiments of the invention have been illustrated and described, it will be apparent that other changes, alterations and modifications may be made without departing from the true scope and spirit of the appended claims.

What is claimed is:

1. Apparatus for applying a liquid coating to motion picture film immediately prior to the projection thereof comprising a pair of cooperating elements movable into a fixed closed position and to an open position, liquid absorbent pads carried by said elements, said pads being in surface contacting engagement when said elements are in a closed position; means for feeding a liquid to said pads, means for guiding and moving a film to be coated between said pads, and means for releasably holding said elements in the closed position, the last said means releasing said elements from the closed position and permitting at least one element to move clear of the film in response to a predetermined increased pressure by the film on said pads.

2. Apparatus according to claim 1 wherein said film includes at least one set of sprocket holes and said pads and film are aligned one with the other to coat the projected portions of said film while maintaining the said sprocket holes out of contact with the pads.

3. Apparatus according to claim 1 wherein said cooperating elements are hinged one to the other along one edge thereof and said releasable holding means includes magnetic means on at least one other edge thereof.

4. Apparatus according to claim 1 wherein said liquid is fed to said pads by gravity.

5. Apparatus according to claim 1 wherein said liquid is fed to said pads by wicks having portions immersed in a liquid reservoir.

6. Apparatus for applying a liquid coating to motion picture film immediately prior to the projection thereof comprising a pair of cooperating elements movable into closed and open positions, liquid absorbent pads carried by said elements, said pads being in surface contacting engagement when said elements are in a closed position; means for feeding a liquid to said pads, means for guiding and moving a film to be coated between said pads, and means for releasably holding said elements in the closed position, the last said means releasing said elements for outward relative movement in response to a predetermined increased pressure by the film on said pads, said cooperating elements being hinged one to the other along one edge thereof and the last said means including a toggle spring connected to said elements to hold them together when in the closed position and responsive to slight movement of the elements out of the closed position to move them to said fully open position.

7. Apparatus for applying a liquid coating to motion picture film immediately prior to the projection thereof comprising a pair of cooperating elements movable into closed and open positions, liquid absorbent pads carried by said elements, said pads being in surface contacting engagement when said elements are in a closed position; means for feeding a liquid to said pads, means for guiding and moving a film to be coated between said pads, and means for releasably holding said elements in the closed position, the last said means releasing said elements for outward relative movement in response to a predetermined increased pressure by the film on said pads, including electromagnetic means responsive to movement of said elements out of the fully closed position to cause said elements to be moved to a fully open position.

8. Apparatus for coating motion picture film with a liquid prior to the projection thereof comprising a liquid applicator formed of at least two cooperating elements each including an absorbent pad, means for holding said elements in fixed overlying relationship with said pads in surface contact, means for guiding the film between said pads, and fluid supply means for wetting the absorbent pads, said supply means including a fluid reservoir disposed above said applicator, valve means for controlling the flow of said liquid in the form of drops from said reservoir, a horizontal tubular member disposed beneath said reservoir and having a central opening therein, tubes connecting the ends of said tubular member with said applicator, said opening in said tubular member being in vertical alignment with said liquid control means so that said drops will fall into said opening and distribute themselves substantially equally between said tubes for wetting both of said pads.

9. An applicator for applying liquid to motion picture film comprising a pair of cooperating applicator elements, means hinging said elements one to the other for movement about an axis spaced from one edge thereof and spring means connected to said applicator elements, said spring means being disposed between said axis and said applicator edge with the applicator in the closed position to hold said applicator in said closed position and movable to the side of said axis away from said applicator edge when said applicator elements are moved to a slightly separated position whereby said spring will move said elements to said open position.

10. An applicator for applying a liquid coating to motion picture film comprising a pair of cooperating applicator elements movable to an open position and to a fixed closed position, electromagnetic means operable to move said elements to an open position, a switch movable to its open position by at least one of said elements when said elements are in the closed position, electrical connections between said switch, magnet and a power source, and means holding said applicator elements in said closed position whereby movement of the elements out of the closed position will close said switch and cause said magnetic means to move said elements to their open position.

11. Apparatus for coating motion picture film with a liquid prior to the projection thereof comprising a liquid applicator formed of at least two cooperating elements each including an absorbent pad, means for holding said elements in overlying relationship with said pads in surface contact, means for guiding the film between said pads, and fluid supply means for wetting the absorbent pads, said supply means including liquid reservoir containing perchlorethylene and disposed above said applicator, valve means for controlling the flow of said liquid in the form of drops from said reservoir, a horizontal tubular member disposed beneath said reservoir and having a central opening therein, tubes connecting the ends of said tubular member with said applicator, said opening in said tubular member being in vertical alignment with said liquid control means so that said drops will fall into said opening and distribute themselves substantially equally between said tubes for wetting both of said pads.

12. Apparatus for applying a liquid coating to motion picture film immediately prior to the projection thereof comprising a pair of cooperating elements movable into closed and open positions, liquid absorbent pads carried by said elements, said pads being in surface contacting engagement when said elements are in a closed position; means for feeding a liquid to said pads, means for guiding and moving a film to be coated between said pads, and means for releasably holding said elements in the closed position, the last said means releasing said elements for outward relative movement in response to a predetermined increased pressure by the film on said pads, said releasable holding means including magnetic means operable to hold the cooperating elements in the closed position and responsive to said increased pressure by the film to permit movement of said elements to the fully opened position.

13. Apparatus for applying a liquid coating containing perchlorethylene to motion picture film immediately prior to projection thereof comprising a pair of cooperating hollow elements movable from an open position to a fixed closed position, a liquid absorbent pad carried in each element for applying a liquid to a film moving therebetween, said pads being in surface contacting engagement about said film when said elements are in the closed position, a vessel containing a liquid including prechlorethylene, means connected with said vessel and elements for feeding said liquid to said pads, and means releasably holding said elements in the closed position, the last said means releasing said elements for movement to the open position in response to a predetermined increased pressure by the film on the pads.

References Cited in the file of this patent

UNITED STATES PATENTS

| | | |
|---|---|---|
| 861,309 | Neuer | July 30, 1907 |
| 1,205,039 | Singleton et al. | Nov. 14, 1916 |
| 1,208,664 | Russak et al. | Dec. 12, 1916 |
| 1,279,961 | Anable | Sept. 24, 1918 |
| 1,581,198 | Gramsa | Apr. 20, 1926 |
| 1,927,284 | Howell | Sept. 19, 1933 |
| 2,070,177 | Pickett | Feb. 9, 1937 |
| 2,184,610 | Eaton | Dec. 26, 1939 |
| 2,337,808 | Ford | Dec. 28, 1943 |
| 2,340,204 | Pike | Jan. 25, 1944 |
| 2,351,371 | Smith | June 13, 1944 |
| 2,408,438 | Mills | Oct. 1, 1946 |
| 2,551,329 | Klemola | May 1, 1951 |
| 2,713,006 | Hunter | July 12, 1955 |

FOREIGN PATENTS

| | | |
|---|---|---|
| 848,908 | Germany | Sept. 8, 1952 |